United States Patent [19]

De Bruine et al.

[11] Patent Number: 4,638,965
[45] Date of Patent: Jan. 27, 1987

[54] UNIVERSAL BRACKET ASSEMBLY

[75] Inventors: Mark De Bruine, Temperance; Kenneth Spotts, Dundee, both of Mich.

[73] Assignee: AP Industries, Inc., Toledo, Ohio

[21] Appl. No.: 783,828

[22] Filed: Oct. 3, 1985

[51] Int. Cl.⁴ .......................................... E21F 17/02
[52] U.S. Cl. ..................................... 248/59; 180/89.2; 248/610
[58] Field of Search ............... 248/59, 58, 60, 589, 248/610, 62, 65, 203; 180/296, 309, 89.2

[56] References Cited

U.S. PATENT DOCUMENTS

| | | | |
|---|---|---|---|
| 1,313,113 | 8/1919 | Pleister | 248/903 |
| 3,014,681 | 12/1961 | Feil | 248/60 |
| 3,292,887 | 12/1966 | Cassel et al. | 248/610 X |
| 3,735,950 | 5/1973 | Paintin | 248/62 |
| 4,004,768 | 1/1977 | Evans et al. | 248/59 |
| 4,085,816 | 4/1978 | Amagai et al. | 248/62 X |
| 4,116,411 | 9/1978 | Masuda | 180/89.2 X |
| 4,309,019 | 1/1982 | Bloom | 248/59 X |
| 4,413,799 | 11/1983 | Gabriel | 248/59 |
| 4,465,252 | 8/1984 | Donovan et al. | 248/60 |

Primary Examiner—Ramon O. Ramirez
Attorney, Agent, or Firm—Anthony J. Casella; Gerald E. Hespos

[57] ABSTRACT

A universal mounting bracket assembly is provided to mount an exhaust system to a vehicle. The universal mounting bracket assembly includes a clamp mountable to a pipe of the exhaust system. The clamp is adjustably mountable to an elongated support plate. A formed support rod is mountable to the vehicle and adjustably attachable to the elongated support plate. The formed support rod may be mounted to the vehicle through a rubber insulator.

5 Claims, 8 Drawing Figures

UNIVERSAL BRACKET ASSEMBLY

BACKGROUND OF THE INVENTION

The exhaust system of a vehicle typically includes an exhaust pipe, a muffler and a tailpipe which are connected to one another and extend circuitously from the engine compartment to the rear of the vehicle. The exhaust system may also include anti-pollution devices, such as catalytic converters. The exhaust system is mounted to the underside of the vehicle at a plurality of support locations. This mounting of the exhaust system to the vehicle typically has been carried out with a plurality of mounting brackets. A mounting bracket generally includes a first portion that is bolted or welded to a support point on a vehicle and a second portion that is secured to or engages the exhaust system to hold the system at a preferred spaced relationship to the vehicle.

The prior art support brackets have taken many forms. Many such support brackets have included an elongated band having a plurality of apertures therethrough. The bands have been formed from either thin strips of metal or rubber. These bands could either be bolted to a selected support point on the vehicle or could be wrapped around a support point and bolted to itself to define a loop. The opposed end of the band has included a support for attachment to or engagement with the exhaust system component. For example, the supports may be welded directly to the exhaust system component.

Recently, rubber insulators have been developed for use with exhaust system brackets. These insulators are solid rubber members that typically are at least 0.75 inch thick and that are provided with at least one pair of apertures extending therethrough. The apertures are adapted to receive an elongated metallic stud. The stud is provided with an enlarged head that can be forced through an aperture in the insulator, but can not readily be removed therefrom. The opposed end of the stud then is welded to either a support point on the vehicle or the exhaust system component. A further discussion of these insulators and a tool for removing the studs therefrom is included in U.S. patent application Ser. No. 738,765, filed May 29, 1985 and assigned to the assignee of the subject invention.

Although the prior art mounting brackets for exhaust systems have generally performed well, they have provided little flexibility to the exhaust system installer. More particularly, even a brief look at any of the many available exhaust system catalogs shows that the exhaust systems differ from one vehicle to the next and that the typical installer will require a very large inventory of mounting brackets. Even with a large inventory, many speciality situations arise which can not readily be met by the available brackets. In these situations the installer will either have to fabricate a special bracket or modify an existing bracket to suit a particular need.

In view of the above, it is an object of the subject invention to provide a universal bracket for vehicular exhaust systems.

It is another object of the subject invention to provide an efficient exhaust system bracket that can be employed with a mounting stud and rubber insulator previously mounted to a vehicle.

It is an additional object of the subject invention to provide an exhaust system bracket that can be adjusted readily in the longitudinal direction, the lateral direction and the vertical direction and that can be rotated to achieve a desired angular alignment.

Another object of the subject invention is to provide a mounting bracket that does not require special tools to be mounted on a vehicle.

SUMMARY OF THE INVENTION

The subject invention is directed to a universal mounting bracket for an exhaust system. The bracket of the subject invention can be adjusted along three distinct axis, namely, the longitudinal location along the pipe, the lateral position between the pipe and the support point on the vehicle and the relative elevational difference between the support point and the pipe. Additionally, the bracket can be adjusted to various angular alignments of the pipe as well as angular alignments of the mounting bracket to meet the existing space limitations on the often cluttered underside of the vehicle. Furthermore, the mounting bracket of the subject invention is universal to the extent that components can be interchanged to accommodate pipes of various diameters and to accommodate a large number of means for mounting the bracket to the vehicle.

The universal bracket includes an elongated support plate having a plurality of apertures extending therethrough. The support plate may include a pair of downwardly extending rails on the opposed longitudinal sides thereof for added support and rigidity. The elongated mounting plate may include a first circular aperture at a first longitudinal end thereof and a pair of elongated cut outs aligned collinearly and disposed between the circular aperture and the second longitudinal end of the mounting plate.

The mounting bracket assembly further may include a formed support rod the first end of which includes means for mounting to this support plate, such as an array of external threads, and the second end of which includes means for supporting the bracket relative to the vehicle. The first end may be dimensioned to pass through one of the apertures in the elongated support plate. Preferably, the first end of the formed support rod is dimensioned to pass through the circular aperture at the first end of the support plate. The relative position of the formed support rod to the support plate can be adjustably but securely established by threadably attaching nuts to the threaded end of the formed support rod on each side of the support plate. More particularly, a first nut can be threadably mounted on the formed support rod at an axial location thereon which defines the preferred axial location of the formed rod relative to the support plate. The formed rod then can be inserted through the circular aperture in the support plate and can be fixed axially in that position by applying a second nut to the threaded end and tightening the second nut against the support plate. The rotational alignment of the formed support rod relative to the support plate also can be adjusted prior to the complete tightening of the second nut on the threaded end of the formed support rod.

The second end of the formed suppport rod can take any of a variety of possible shapes in accordance with the space limitations on the underside of the vehicle and in accordance with the preferred method of attachment to the vehicle. For example, the second end of the formed support rod can define a stud disposed generally at right angles to the threaded end of the rod and having an enlarged head adapted to be securely mounted to a rubber insulator. This rubber insulator may already be mounted to the car, and the exhaust system installer is required only to select a formed rod having a second end and an enlarged head that can be received in the rubber insulator. The precise configuration on this formed end can be consistent with the configurations of prior art studs that might be welded to an exhaust system component. Alternatively, the formed rod can be manufactured from a material that can readily be deformed by the installer to reflect the available space on the vehicle. The second end of the formed rod can also be configured to be mounted by welding, bolting or other such means to the vehicle.

The bracket assembly further includes a clamp means for securing the pipe or muffler nipple to the support plate. The clamp means can define a U-bolt having a pair of opposed generally parallel threaded ends. The U-bolt will be dimensioned to engage the pipe or muffler nipple while the opposed threaded ends thereof will be dimensioned to pass through apertures in the support plate. The U-bolt can be secured to the support plate by nuts engaged on the opposed threaded ends thereof. If the support plate is provided with a pair of elongated slots, the relative position of the U-bolt, and hence the position of the pipe or muffler nipple relative to the formed rod, can be adjusted. The clamp means further may include a support base having an arcuate seat into which the pipe or muffler nipple may be placed. The support base can include apertures through which the ends of the U-bolt may pass. Thus, the pipe or muffler nipple may be engaged between the arcuate portion of the U-bolt and the arcuate seat of the support base. The threaded ends of the U-bolt then may be passed through apertures in the support plate and tightened in that position by nuts. This construction provides a positive retention of the pipe or muffler nipple with an even distribution of pressure thereon. This construction also enables various adjustments to the angular alignment of the support plate relative to the underside of the vehicle. Specifically, the nuts applied to the U-bolt need not be at identical locations thereon, and the threaded legs of the U-bolt need not be perpendicular to the support plate.

Other possible constructions include a support plate that is not planar, but rather includes one or more bends. For example, the support plate may be bent between the aperture for the formed rod and the apertures for the clamp means. Alternatively, the support plate can be bent between the apertures for the clamp means such that the support plate contributes further to the engagement of the pipe or muffler nipple. These various modifications can be carried out by the installer either in accordance with specific installation instructions or to solve certain one of a kind installation problems. The mounting of the subject universal bracket does not require special tools and can be carried out quickly for any possible configuration.

DETAILED DESCRIPTION OF THE PREFERRED EMBODIMENT

Figure 1:
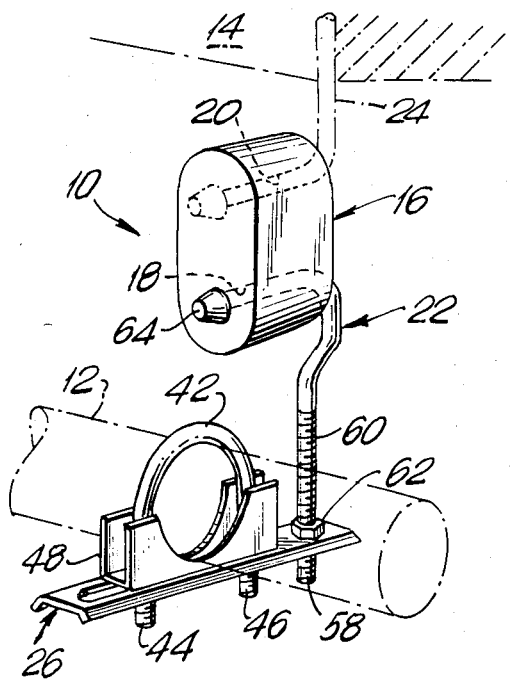
FIG. 1 is a perspective view of the universal mounting bracket of the subject invention.
Figure 2:
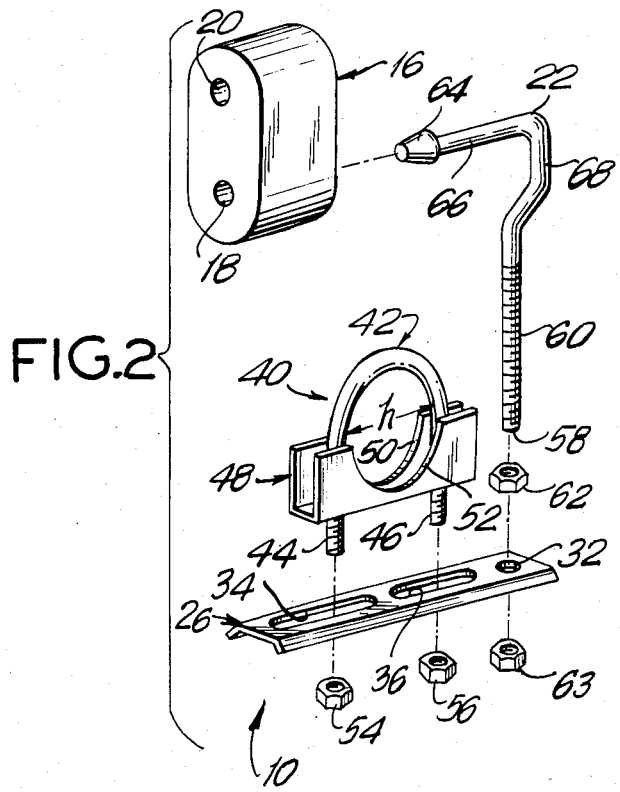
FIG. 2 is an exploded perspective view of the universal mounting bracket of the subject invention.

The universal mounting bracket of the subject invention is indicated generally by the numeral 10 in FIGS. 1 and 2. With reference to FIG. 1, the universal mounting bracket 10 enables an exhaust system component, such as the pipe or muffler nipple 12 to be securely mounted to an associated vehicle 14. More particularly, the universal mounting bracket 10 enables the secure mounting of any of a wide range of exhaust system components 12 to be mounted to an equally wide range of vehicles 14.

With reference to FIGS. 1 and 2, the universal mounting bracket 10 of the subject invention is illustrated as including a rubber insulator 16. The rubber insulator 16 is provided with a pair of apertures 18 and 20 extending entirely therethrough. The aperture 18 is adapted to receive a formed rod 22 which, as explained further below, is part of universal mounting bracket 10. The aperture 20, on the other hand, is adapted to be mounted to a support stud 24 which in turn is fixedly mounted to the vehicle 14. It is important to note that in other embodiments of applicant's invention, as explained herein, the universal mounting bracket 10 may not include a rubber insulator 16, but may merely be adapted for use with a rubber insulator already mounted to the vehicle 14. On the other hand, still other embodiments may include a formed rod 22 that is adapted to be mounted to the vehicle 14 by welding or the like without a rubber insulator.

Figure 3:
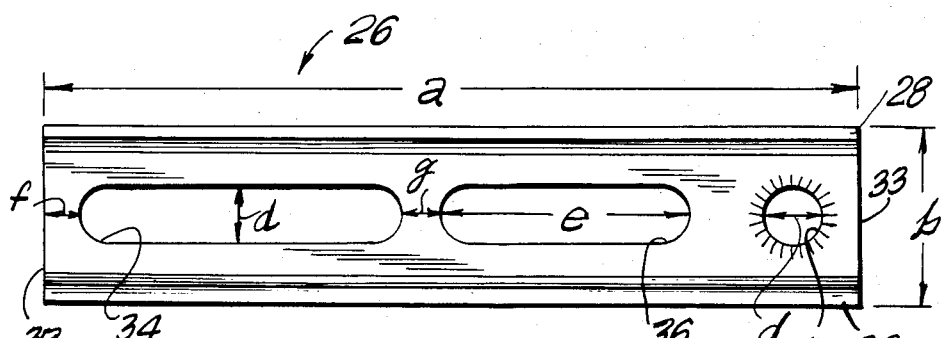
FIG. 3 is a top plan view of the support plate of the universal mounting bracket of the subject invention.
Figure 5:
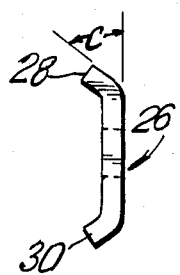
FIG. 5 is an end elevational view of the support plate shown in FIG. 3.
Figure 4:
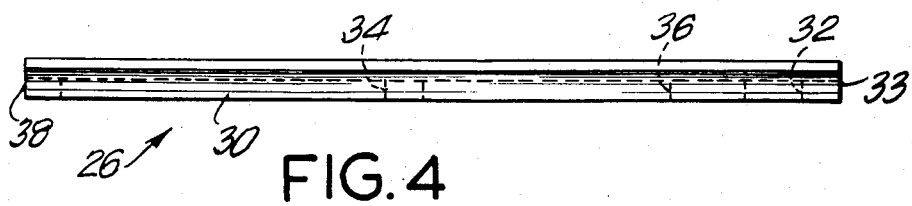
FIG. 4 is a front elevational view of the support plate shown in FIG. 3.

The universal mounting bracket assembly 10 further includes an elongated support plate 26 to which the formed rod 22 is mounted. As illustrated more clearly in FIGS. 3-5, the elongated support plate 26 is of generally rectangular configuration, and preferably is between five and six inches long, as indicated by dimension "a" in FIG. 3, and is preferably between 0.75 and 1.25 inches wide, as indicated by dimension "b" in FIG. 3. To provide strength and rigidity, the support plate 26 also is provided with a pair of downwardly extending rails 28 and 30 which extend substantially along the entire length of the support plate 26 on the opposed longitudinal sides thereof. The rails 28 and 30 preferably are aligned at an angle "c" of about 30° relative to the plane of the remainder of support plate 26.

The support plate 26 further is provided with a generally circular aperture 32 extending entirely therethrough adjacent the first end 33 thereof. The aperture 32 preferably includes a diameter "d" of between approximately 0.25 inches and 0.50 inches. Support plate 26 further includes a pair of elongated cut outs 34 and 36. The width of cut outs 34 and 36 is approximately equal to the diameter "d" of aperture 32 in the support plate 26. The cut outs 34 and 36 preferably are at least 1.5 inches long as indicated by dimension "e" in FIG. 3. Additionally, to ensure adequate support, the cut out 34 is spaced at least approximately 0.25 inches inwardly from second end 38 of support plate 26, as indicated by dimension "f" in FIG. 3. Similarly, to ensure adequate support, the cut outs 34 and 36 are spaced from one another by at least approximately 0.25 inches as indicated by dimension "g" in FIG. 3.

Returning to FIGS. 1 and 2, the universal mounting bracket assembly 10 further includes clamp means 40 which is mountable to the support plate 26. The clamp means 40 preferably includes a U-bolt 42 which defines a diameter "h" substantially equal to or greater than the diameter of the pipe or muffler nipple to be retained therein. The U-bolt 42 includes opposed substantially parallel threaded ends 44 and 46 which are dimensioned to pass through the cut outs 34 and 36 in the support plate 26. The clamp means 40 further includes a support base 48 through which the threaded ends 44 and 46 of the U-bolt 42 may pass. The support base 48 further defines generally semicircular seats 50 and 52 into which the pipe or muffler nipple 12 may be seated.

The clamp means further includes a pair of clamping nuts 54 and 56 which are threadably engageable with the threaded ends 44 and 46 of the U-bolt 42. Thus, the threaded ends 44 and 46 of the U-bolt 42 may be passed around opposed sides of a pipe or muffler nipple 12 and then through the apertures provided in the support base 48 such that the combination of the U-bolt 42 and the support base 48 circumscribe and engage the pipe or muffler nipple 12. The threaded ends 44 and 46 may then be passed through the elongated cutouts 34 and 36 in the support plate 26. The clamping nuts 54 and 56 may then be threadably mounted on the threaded ends 44 and 46 of the U-bolt 42 to securely engage the entire clamp means 40 and the pipe or muffler nipple 12 mounted therein to the support plate 26.

Figure 6:
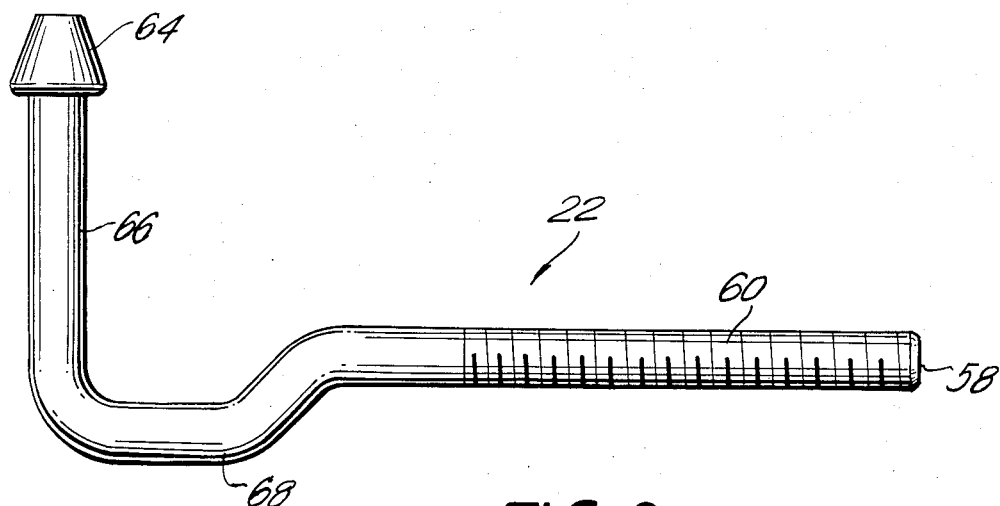
FIG. 6 is an elevational view of the formed rod of the universal mounting bracket of the subject invention.

The formed support rod 22, as shown in FIGS. 1, 2 and 6 is provided with a first end 58 having an array of external threads 60 extending therefrom. The portion of the formed rod 22 having the threads 60 thereon is dimensioned to pass through the circular aperture 32 on support plate 26. The support rod can thus be adjustably but securely mounted relative to support plate 26 with support nuts 62 and 63. More particularly, the support nut 62 may first be threadably advanced on formed rod 22 to a location which defines the preferred axial position of the formed rod 22 relative to the support plate 26. The formed rod 22 may then be passed through aperture 32 in support plate 26 and the support nut 63 can then be threadably mounted to the formed rod 22 and tightened against the support plate 26. Thus, a secure axial positioning of the formed rod 22 relative to the the support plate 26 is provided. The angular position of the formed support rod 22 can be adjusted as necessary by merely rotating the formed support rod 22 relative to the support plate 26 prior to complete tightening of the nut 63.

The second end 64 of the formed support rod 22 defines an enlarged head which is configured to be inserted into aperture 18 of the rubber insulator 16, but which can not easily be removed from the rubber insulator 16. The portion 66 of formed support rod 22 immediately adjacent the enlarged head 64 thereof is substantially straight to enable efficient mounting of the formed rod 22 in the rubber insulator 16, and is generally orthagonal to the first end 58. However, the intermediate portion 68 of the formed support rod 22 extending between the array of threads 60 and the straight portion 66 thereof is substantially non-linear in configuration. More particularly, the intermediate portion 68 is generally curved back toward the enlarged head 64 such that threaded portion 60 is aligned with a point intermediate the length of straight portion 66. This enables a fairly even distribution of weight carried by the universal mounting bracket assembly 10. More particularly, in this configuration the pipe or nipple 12 is supported substantially directly below the insulator 16.

Figure 7:
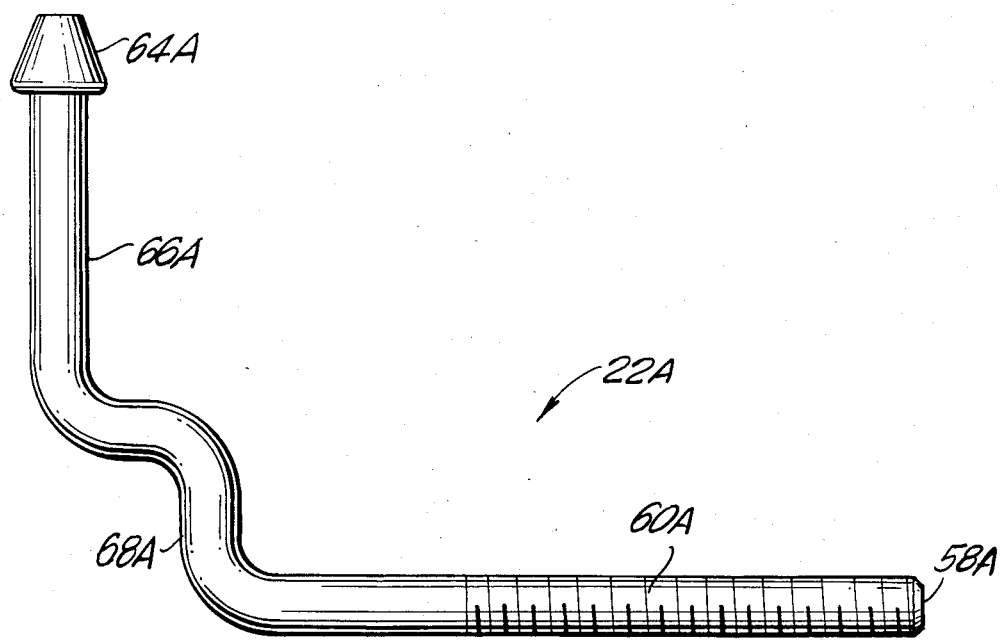
FIG. 7 is an elevational view of a second embodiment of the formed rod of the subject invention.

FIG. 7 illustrates an alternate support rod 22A which is provided with a configuration that is distinct from the configuration of the formed support rod 22 in FIG. 6. More particularly, the intermediate portion 68A of rod 22A includes an additional pair of bends to enable the support rod 22A to bypass an obstacle on the underside of the vehicle to which the universal mounting bracket assembly 10 will be mounted. The remainder of the formed rod 22A, however, is substantially identical to the formed rod 22 shown in FIG. 6, with comparable parts receiving similar numerical identifications.

Figure 8:
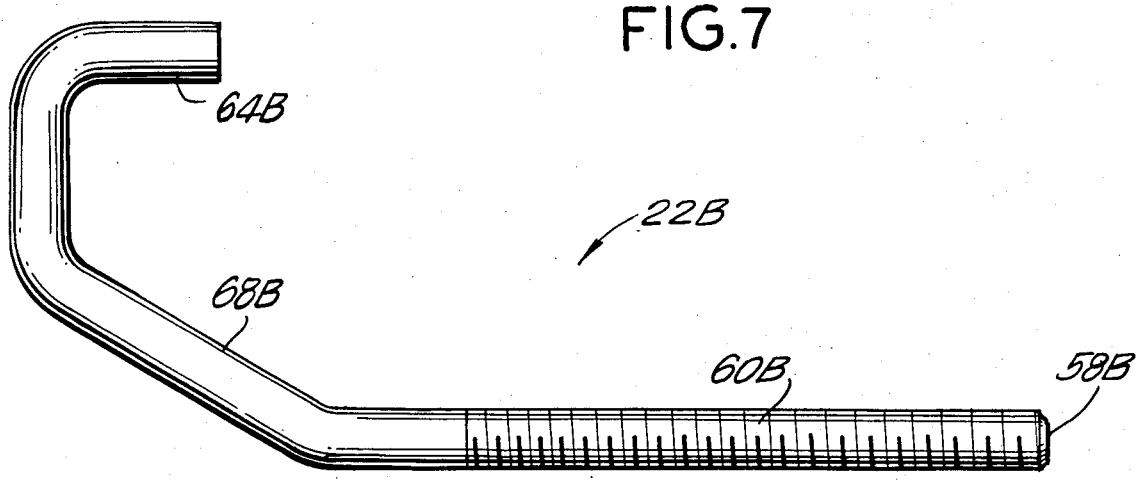
FIG. 8 is an elevational view of a third embodiment of the formed rod of the subject invention.

Turning to FIG. 8, a second alternate embodiment of the formed rod is shown as indicated generally by the numeral 22B. The formed rod 22B includes a first end 58B from which an array of external threads 60B extends. Formed support rod 22B differs from the previously described structures, however, in that the second end 64B thereof is not provided with an enlarged head. The intermediate portion 68B of formed support rod 22B can be formed into any shape compatible with the space availability on the vehicle.

Returning to FIGS. 1 and 2, the universal mounting bracket assembly 10 is used by engaging the U-bolt 42 and the support base 48 around opposed sides of the pipe or muffler nipple 12. The elongated support plate 26 then is positioned on the U-bolt 42 such that the threaded ends 44 and 46 of the U-bolt 42 pass respectively through the elongated cut outs 34 and 36 respectively. Clamping nuts 54 and 56 then are loosely applied to the threaded ends 44 and 46 such that the elongated support plate 26 can be moved laterally relative to the pipe or muffler nipple 12, and such that the combination of the U-bolt 42 the support base 48 and the support plate 26 can be moved longitudinally along the pipe or muffler nipple 12.

In many situations, the vehicle 14 to which the exhaust system will be mounted already includes a mounting stud 24 thereon. In these situations, an appropriatly formed support rod 22 is mounted to a new rubber insulator 16 which in turn is mounted on the stud 24 already in place on the vehicle. In other situations, the rubber insulator 16 previously on the vehicle is still functional and can be retained. Therefore it would only be necessary to mount a new formed support rod 22 in the previously mounted rubber insulator 16. In still other applications, the vehicle may not have an acceptable mounting stud 24 affixed thereto. In these situations a new mounting stud 24 and insulator 16 may be secured to the vehicle, or a formed support rod such as 22B, described above, may be secured directly to the vehicle without a rubber insulator 16 and a stud 24.

In any of the above described situations, after the formed support rod 22, 22A, or 22B is secured to the vehicle 14, the first support nut 62 is mounted to the threaded portion 60 thereof. The exhaust system of which pipe or muffler nipple 12 is a part then is advanced toward the vehicle such that the first end 58 of formed support rod 22 passes through the circular aperture 32 of the elongated support plate. The pipe or muffler nipple 12 is loosely held in this position by attaching nut 63 to the threaded array 60. After this initial loose mounting is completed, other mounting bracket assemblies on the exhaust system are appropriately mounted to the vehicle 14. This initial loose mounting enables appropriate movement of the various parts of the universal mounting bracket assembly 10 relative to one another. More particularly, the pipe or muffler nipple 12 may move longitudinally or laterally relative to the universal mounting bracket assembly 10. Additionally, the pipe or muffler nipple 12 may be rotated about the formed support rod 22 and may be raised or lowered relative thereto. Furthermore, a certain amount of twisting along the elongated support plate 26 is possible to clear certain obstacles on the vehicle 14.

After the various mounting bracket assemblies 10 have been mounted to both the exhaust system and the vehicle 14, the clamping nuts 54, 56 and the second support nut 63 may be tightened to securely retain the exhaust system in position relative to the vehicle 14.

In summary, a universal mounting bracket assembly is provided which includes a clamp means for mounting around an exhaust system component. The clamp means is adjustably mounted to an elongated support plate. The universal mounting bracket assembly further includes a formed support rod, one end of which is adjustably mounted to the support plate, and the other end of which is connectable to the vehicle. The connection of the formed support rod to the vehicle may be through a rubber insulator. Alternatively, the support rod may be welded directly to the vehicle. The universal mounting bracket assembly may be adjusted both longitudinally and laterally relative to the exhaust system pipe to which it is mounted. Additionally, the support plate may be adjusted angularly relative to the vehicle and may be moved closer to or further from the vehicle.

While the invention has been described and illustrated relative to certain preferred embodiments, various modifications can be made thereto without departing from the scope of the invention as defined by the attached claims.

We claim:

1. A universal mounting bracket assembly for mounting an exhaust pipe to a vehicle, said assembly comprising:
    an elongated support plate having opposed first and second ends and a pair of support rails extending along opposed sides thereof between the first and second ends, said elongated support plate further including a circular aperture generally adjacent to the first end and a pair of elongated cut outs disposed intermediate the circular aperture and the second end of said elongated support plate, said elongated cut outs and said circular aperture being generally collinearly with one another;
    a support base mounted to said elongated support plate adjacent the elongated cut outs therein, said support base including an arcuate support surface for engaging the pipe;
    a U-bolt dimensioned to engage the pipe, said U-bolt including a pair of generally parallel threaded ends, said threaded ends of said U-bolt extending through said support base and through the elongated cut outs of said support plate;
    a pair of clamping nuts threadably mounted to the ends of said U-bolt;
    a formed support rod having opposed first and second ends and being characterized by an array of external threads extending from the first end thereof to a point intermediate said first and second ends, said second end of said formed support rod being mountable to the vehicle, the first end of said formed support rod extending through said circular aperture in said elongated support plate;
    first and second support nuts threadably mounted to said formed support rod, said first and second support nuts being disposed on opposite sides of said elongated support plate, whereby the U-bolt and the formed support rod can be moved relative to the elongated support plate to effect the secure adjustable mounting of the pipe to the vehicle.

2. A universal mounting bracket assembly for mounting an exhaust pipe to a vehicle, said assembly comprising:
    an elongated support plate having opposed first and second ends and a pair of support rails extending along opposed sides thereof between the first and second ends, said elongated support plate further including an aperture generally adjacent to the first end and at least one elongated cut out disposed intermediate the aperture and the second end of said elongated support plate, said elongated cut out and said aperture being generally collinear with one another;
    a U-bolt dimensioned to engage the pipe, said U-bolt including a pair of generally parallel ends extending through said elongated cut out of said support plate;
    clamping means mountable to the ends of said U-bolt for adjustably mounting the U-bolt to the elongated support plate;
    a formed support rod having opposed first and second ends, the first end extending through the aperture in said elongated support plate, said second end of said formed support rod being mountable to the vehicle; and
    at least one fastening means adjustably mounted to said first end of said formed support rod for adjustably mounting the formed support rod to said elongated support plate, whereby the U-bolt and the formed support rod can be moved relative to the elongated support plate to effect the secure adjustable mounting of the pipe to the vehicle.

3. A universal mounting bracket assembly as in claim 2, wherein the second end of said formed support rod includes an enlarged head.

4. A universal mounting bracket assembly as in claim 3 further including a rubber insulator having at least two apertures extending therethrough, said rubber insulator being mounted to the second end of said elongated support rod such that the enlarged head is disposed on one side of said rubber insulator while the external threads thereof are disposed on the other side of the rubber insulator.

5. A universal mounting bracket assembly as in claim 4 wherein the formed support rod is non-linear.

* * * * *